Patented Sept. 16, 1930

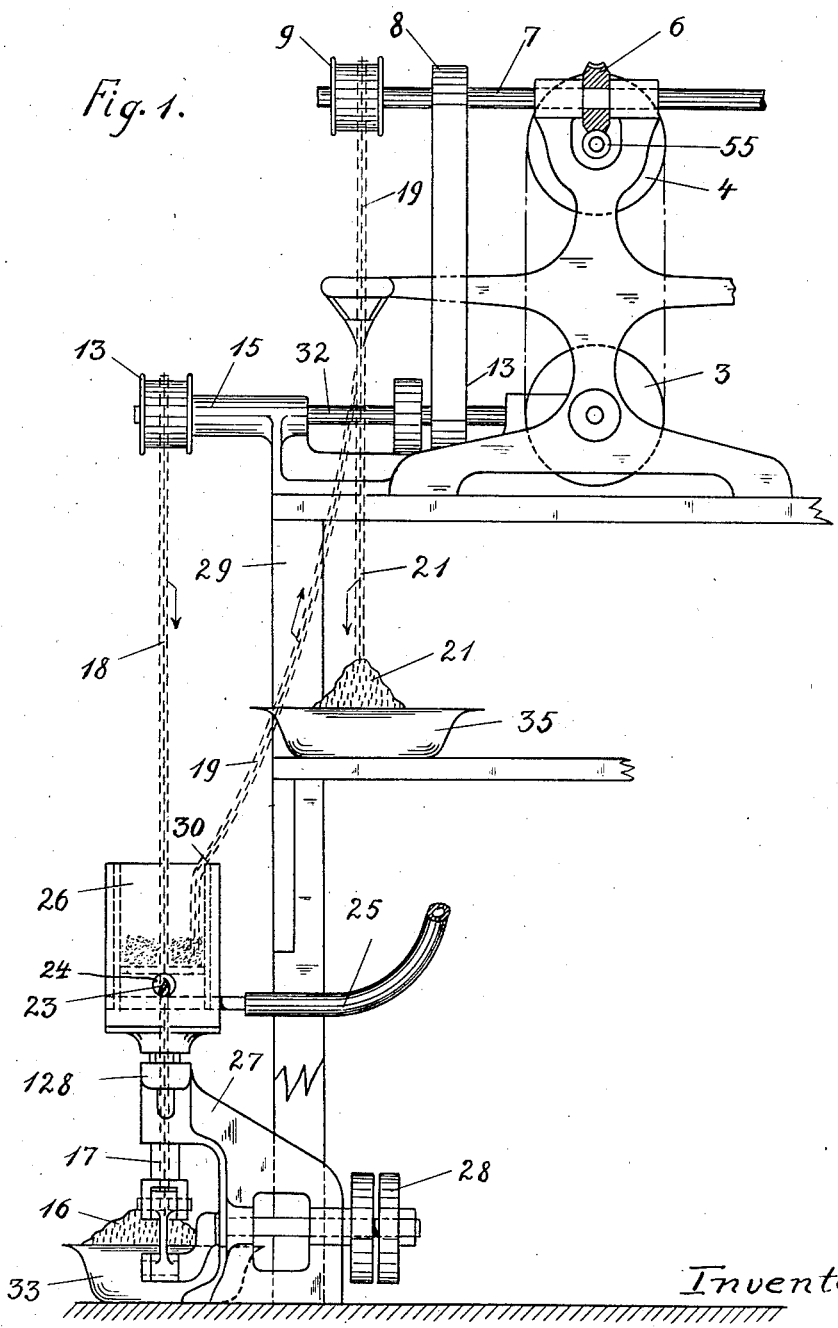

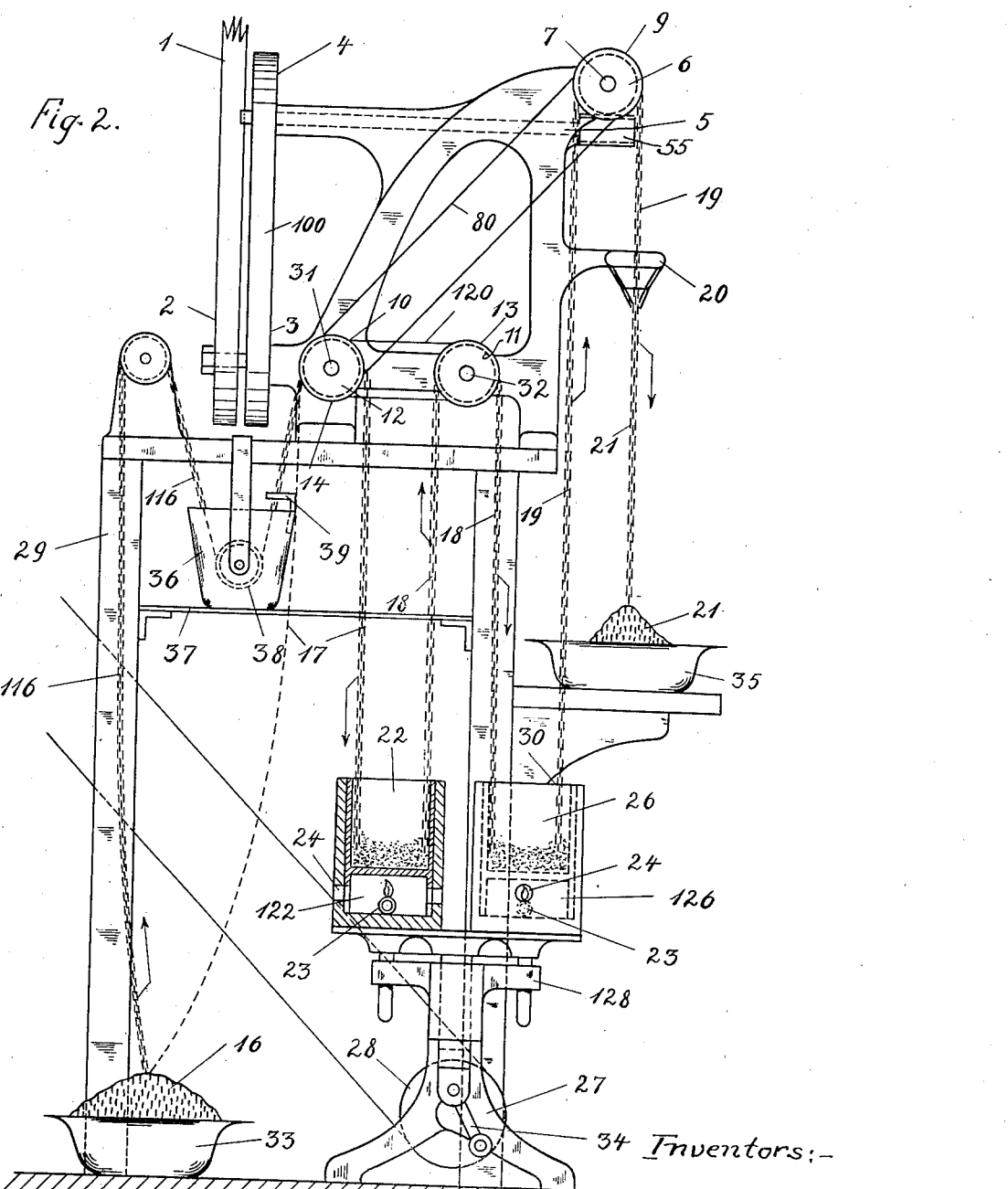

1,775,839

UNITED STATES PATENT OFFICE

JONATHAN WENZ, GEORG BRUNHÜBNER, AND JOSEF ALVERA, OF PFORZHEIM, GERMANY, ASSIGNORS TO ERNST GIDEON BEK, OF PFORZHEIM, GERMANY

ART OF SOLDERING THE LINKS OF WIRE CHAINS OR CHAIN MESH

Application filed February 14, 1927. Serial No. 168,181.

The present invention has reference to improvements in the art of soldering machined metal blanks, such as for instance a concatenation of close links, ring mesh fabric, and the like, and particularly to an improved method of providing the pre-formed chain links, or the like, with the requisite kind and amount of soldering material.

In the art of soldering the pre-formed links of chains, and like articles of jewelry, it is a well recognized drawback that on introduction of the liquid or paste solder or flux in between the two opposed link ends to be solder-shut, solder or flux will unduly spread and attach itself to other places than just the link joints, with the result that stiff-soldering of the links will occur, or that excess solder will stick to the link surface, rendering thereby the finished product unsaleable.

For this reason the excess solder and flux must be removed prior to the actual soldering operation, for instance by scouring, which, however, in the methods heretofore employed, cannot be satisfactorily accomplished by hand, for if the scouring is of too short duration not all of the surplus foreign matter will be removed, or if the articles are scoured for too long a period, then too much of the surplus material is removed to allow of a perfect solder joint being made.

The object of the present invention is to improve on the prior soldering methods, by mechanically more efficiently and reliably supplying the requisite amount of soldering and fluxing media at, or after, introduction thereof, or of an initial part thereof, into the joint gaps. The article to be soldered, to which in the further description I shall generically refer to as "chain link", according to the present invention, may, where the method is performed by the actions of a machine, be caused to pass through a series of stations, preferably in immediate conjunction with a soldering machine of well known type, or in combination therewith in the form of a self-contained unit.

In soldering the chain links, according to our invention, the links are completely imbedded at the first station in a solder material of pasty or other suitably-fluent character, the excess portion of which on the concatenation leaving the station must be removed. This is readily accomplished by conducting the chain structure through a perforated or slotted rubber scraper member arranged above the first station. The chain is then advanced to a second station containing solder powder. Owing to the dry character of this solder medium with which the chain is rubbed or scoured the moisture of the paste solder is quickly absorbed and the adhesiveness of the paste decreased, whereby as a result of the rubbing or scouring action the surplus solder will drop off, leaving only the requisite amount thereof adhering to the ends of the links and within the link gaps. A great advantage of this scouring step is that while the surplus solder is removed from the chain any voids left remaining in the gaps will be filled by the solder powder, so that any deficiency in the supply of solder material to any of the link gaps will be made up by the deposit of supplemental powdered solder material. The chain is then passed through one or more subsequent stations, in which it is coated with certain substances, for instance a protective coating substance, such as graphite, pumice or the like, as heretofore stated, to prevent the thin gold skin of sheathed or plated stock from melting off or the parts from becoming stiff-soldered. In this case we may also apply at the first station only the flux, in the second station the dry solder, and in the succeeding station the protective coatings.

By solder material of "pasty or other suitably-fluent character" I mean a solder composition sufficiently fluid or plastic to permit it to be spread or smeared over the link surfaces.

The new process materially improves on the prior art, as for instance in cases where the gap between the link ends is of irregular formation due to faulty operation of the link forming instrumentalities which causes too little solder to adhere or to drop out again, where now, according to our invention, the faulty gap will properly be filled with the requisite amount of solder which will not drop out.

The new process further improves over the prior art in that it successfully provides for the soldering of solid wire chain links in place of solder-core links, with a material saving in cost of material and with the result of producing a stronger and more durable chain or one having finer links than can be made by the use of solder-core wire, and which further not only obviates the necessity of employing the costly step of removing from the chain links the oil coating which they have when coming from the chain machine, but makes use of this oil as a suspension agent for holding a primary coating of solder material and admitting of the application of a secondary coating of solder material to fill any voids left vacant of solder material in the link on the removal, by body agitation of the chain and flexion of its links, of excess solder material, the oil remaining burning without residue when the chain is subjected to the action of a heating flame to fuse the solder, so that a chain of superior quality may be produced at a cost much less than the cost of producing chains using solder-cored wire. As by the use of a hot flame very desirable grades of solder may be used, and as this flame will consume the oil left remaining on the chain links, completely and without residue, stiff soldering will not only be prevented, but a chain without surface blemishes will be made.

In order to make our invention more readily understood we will now describe it in connection with the accompanying drawing which illustrates, for the sake of simplicity of description, an apparatus having mainly but two treating stations, Fig. 1 being a front view, and Fig. 2 a side elevation with one of the stations in partial section, both figures in more or less diagrammatical representation.

The belt 1 drives the fixed pulleys 2 and 3 of the soldering machine; a second belt 100 runs from pulley 3 to pulley 4 fast on the worm shaft 5, whose worm 55 meshes with the worm wheel 6 fast on shaft 7, upon which latter are fixed the pulley 8 and the driving drum 9. The pulley 8 is connected by belt 80 to pulley 10 fast on the shaft 31, on which latter are fixed the driving drum 12 and the chain drum 14. Drum 12 drives by belt 120 and pulley 11 the chain drum 13 (Fig. 2) fast on shaft 32. Shaft 32 is also provided with another driving drum (not shown) which drives by belt 120' and pulley 11' a chain drum 13' fast on shaft 32'. The bracket bearings 15 are mounted on the machine standards 29.

The chain is conducted through the stations in the following manner: Into the bottom vessel 33 the chain stock 16 is delivered by the chain making machine, which latter, as it is well known in the art and forms no part of this invention, is not shown here, and the chain is then led as section 17 directly over the front chain drum 14 into the tank 22 of the first station. From here it is conducted as section 18 over the drum 13 into the tank 26 of the second station, and then on in the same manner to further stations, as the case may be, Fig. 2 showing it conducted as section 18' to a tank 126 of a third station when such station is used, and finally it is conducted as section 19 over the driving drum 9 to the soldering device 20, and as finished product 21 into the collecting vessel 35. The tanks 22, 26 and 126 are vibrated or jarred by means of the crank motion 28, 34 mounted on a fixed machine part 27, to which are also secured the guideways 128 for the vibrating tanks, which as shown by way of example are vertically reciprocated. The tanks 22, 26 and 126 are heated by the burners 23 provided in special flame chambers 122 and 126, into which the necessary combustion air can enter through lateral openings 24. The fuel is delivered through the tube 25.

The "limbering-up" of the link concatenation is brought about by bending the chain angularly over the edge of the tanks, so that at every tank the excess solder, flux, and other substances adhering to the links are rubbed off and drop back into the respective tanks to be used over again.

The tanks 22, 26 and 126 of the stations are preferably removable to permit ready emptying, cleaning, and filling, and present a raised bottom, underneath which the heating flame is maintained, as clearly shown in the drawing.

In Fig. 2 we have shown an additional, fourth, station, the tank 36 of which, by way of example, is stationarily mounted on the horizontal table 37. The chain 116 is passed through the tank 36 by means of the roller 38. Excess material, such as solder paste, is scraped off by the slotted or perforated rubber scraper 39, through which the chain passes after leaving the tank 36, and drops back into the latter.

In this immobile station we may use, for instance, solder in pasty or liquid form, in which instance the tank 22 of the first shaker station would contain a scouring medium, and the tank 26 of the second shaker station would contain a substance capable of producing a protective film to prevent stiff-soldering while the tank 126 of the third station would contain a substance capable of producing a protective coating on the precious metal surface.

In another operation which may be carried out the concatenation of links coming from the chain machine may be supplied at the station 36 with solder and flux paste, the excess of which will be wiped off by the scraper 39, after which the chain may be passed to the station 22, where dry fluxing powder may be applied thereto, the chain next passed to the station 26 where a powdered metal solder may be applied thereto, and finally the chain, before passing to the soldering device 20, may be treated at the station 126 with an anti-soldering substance, such as quartz metal, to prevent stiff-soldering or other deleterious action, the excess of material in the passage of the links through the stations 22, 26 and 126 being removed by the vibratory action of said stations and scraping of the links against the walls thereof, as previously described.

What we claim is:—

1. The method of soldering the ends of interconnected links of a length of chain or chain mesh formed of solid wire, which consists in supplying to the entire surfaces of the links a fluent solder material, then scouring the links with a dry powdered solder material to remove all solder material except that contained in the link gaps and to fill any voids in the link gaps with additional solder material, then treating the chain to prevent flow of the solder material when fused out of the gaps, and then subjecting the chain links to the action of heat to fuse the solder material in the gaps thereof.

2. The method of soldering the ends of interconnected links of a length of chain or chain mesh formed of solid wire, which consists in applying to the entire surfaces of the links a fluent solder material, then scouring the links with a dry powdered solder material to remove all solder material except that contained in the link gaps and to fill any voids in the links gaps with additional solder material, then applying to the links a coating capable of preventing the flow of the solder material when fused out of the link gaps, and then subjecting the links to the action of heat to fuse the solder material in the gaps thereof.

In testimony whereof we affix our signatures.

JONATHAN WENZ.
GEORG BRUNHÜBNER.
JOSEF ALVERA.